US006784789B2

(12) United States Patent
Eroglu et al.

(10) Patent No.: US 6,784,789 B2
(45) Date of Patent: Aug. 31, 2004

(54) METHOD AND APPARATUS FOR VERIFYING RFID TAGS

(75) Inventors: Kursat Eroglu, Mukilteo, WA (US); Patrick L. Helton, Marysville, WA (US); Christopher A. Wiklof, Everett, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/349,683

(22) Filed: Jul. 8, 1999

(65) Prior Publication Data

US 2002/0167397 A1 Nov. 14, 2002

(51) Int. Cl.$^7$ .......................... H04Q 5/22; G08B 13/14; G06F 11/00
(52) U.S. Cl. .................. 340/10.6; 340/10.3; 340/572.1; 714/25
(58) Field of Search .............................. 340/10.6, 10.1, 340/825, 572.1; 380/2; 342/42

(56) References Cited

U.S. PATENT DOCUMENTS

| | | | | |
|---|---|---|---|---|
| RE28,732 E | * | 3/1976 | von Hofe | 156/256 |
| 4,802,216 A | | 1/1989 | Irwin et al. | |
| 4,900,386 A | * | 2/1990 | Richter-Jorgensen | 156/250 |
| 5,118,369 A | * | 6/1992 | Shamir | 156/64 |
| 5,448,110 A | | 9/1995 | Tuttle et al. | |
| 5,500,651 A | * | 3/1996 | Schuermann | 340/10.3 |
| 5,594,448 A | * | 1/1997 | d'Hont | 340/935 |
| 5,764,156 A | * | 6/1998 | Chaloux | 340/10.34 |
| 5,864,301 A | * | 1/1999 | Jackson | 340/10.3 |
| 5,983,363 A | * | 11/1999 | Tuttle et al. | 324/605 |
| 6,019,865 A | * | 2/2000 | Palmer et al. | 156/265 |
| 6,104,291 A | * | 8/2000 | Beauvillier et al. | 340/572.1 |
| 6,150,921 A | * | 11/2000 | Werb et al. | 340/10.1 |

* cited by examiner

Primary Examiner—Brian Zimmerman
Assistant Examiner—Clara Yang
(74) Attorney, Agent, or Firm—Seed IP Law Group PLLC

(57) ABSTRACT

An RFID tag verifier includes an RF interrogator that transmits a first and second interrogation signal each having a first operational characteristic that differs from the other by a known amount. The RF interrogator receives a first and second return signal corresponding to the respective interrogation signals. A processor determines a response of the RFID tag as defined by a second operational characteristic of the first and second return signals. The verifier can determine the signal strength of the return signal for varying strengths of the interrogation signal. Typically, a flat response is desired Additionally, or alternatively, the verifier can determine the response in terms of signal strength of the response signals for interrogation signals having different frequencies. In some applications frequency selectivity may be desirable. Additionally, or alternatively, the verifier can determine the response in terms of frequency for interrogation signals having varying strengths. A machine-readable symbol verifier can be coupled to, or formed as part of, the RFID verifier. A printer can be coupled to, or formed as part of, the RFID tag verifier.

6 Claims, 8 Drawing Sheets

US 6,784,789 B2

METHOD AND APPARATUS FOR VERIFYING RFID TAGS

TECHNICAL FIELD

This invention relates to wireless memory devices, commonly known as radio frequency identification ("RFID") tags.

BACKGROUND OF THE INVENTION

RFID tags are wireless communication memory devices that store information, typically concerning an item to which the RFID tag is attached. For example, inventory items can carry RFID tags providing information such as serial numbers, price, weight, and size. The RFID tags permit efficient retrieval of information regarding an item at various points in the manufacturing and distribution chain, and can permit tracking of the item. RFID tags permit relatively large amounts of data to be associated with the item. An RFID tag typically includes a memory, an RF transmitter, an RF receiver, an antenna, and logic for controlling the various components of the memory device. The antenna is generally formed on a flexible substrate, while analog RF circuits and digital logic and memory circuits take the form of an integrated circuit ("IC") carried by the substrate and coupled to the antenna. RFID tags may also include a number of discrete components, such as capacitors, transistors, and diodes.

RFID tags can be either passive or active devices. Active devices are self powered, by a battery, for example. Passive devices do not contain a discrete power source, but derive their energy from the RF signal used to interrogate the RFID tag. Passive RFID tags usually include an analog circuit, which detects and decodes the interrogating RF signal and which provides power from the RF field to a digital circuit in the tag. The digital circuit generally executes all of the functions performed by the RFID tag, such as retrieving stored data from memory and modulating the RF signal to transmit the retrieved data. In addition to retrieving and transmitting data previously stored in the memory, the RFID tag can permit new or additional information to be stored into the RFID tags memory, or can be permit the RF tag to manipulate data or perform some additional functions.

A number of factors may affect the performance of an RFID tag. For example, two RFID tags may each produce different response signals in response to the same interrogation signal due to manufacturing inconsistencies. Additionally, a single RFID tag may produce different response signals in response to two different interrogation signals. For example, an RFID tag may produce a weaker response signal in response to a relatively weaker interrogation signal. This is particularly a problem with passive RFID tags, where the RFID tag derives its operating power from the interrogation signal. The strength of the interrogation signal normally varies with the inverse of the distance. Thus, an RFID tag read at two different distances will receive interrogation signals having two different power levels with which to respond.

Manufacturers and/or users typically desire a uniform response from RFID tags. For example, users will typically desire that all RFID tags in a set have a consistent output signal. Yet a user typically wants a uniform response from any RFID tag in an RFID tag reader's range (e.g., RFID tag response signal's strength and frequency does not vary with direction, frequency, or strength of the interrogation signal). The manufacturer and/or end user may also wish to identify poorly performing tags for removal, or to identify an appropriate frequency range for a particular set of RFID tags. Additionally, the manufacturer and/or end user may wish to label RFID tags with their respective operating characteristic values.

SUMMARY OF THE INVENTION

Under one aspect of the invention, an RFID tag verifier includes an RF interrogator that transmits first and second interrogation signals, each having a first operational characteristic that differs from the other by a known amount. The RF interrogator receives first and second return signals in response to the first and second interrogation signals, respectively. A processor is configured to determine a response of the RFID tag as defined by a second operational characteristic of each of the first and second return signals.

In one aspect, the RFID tag verifier determines the signal strength of the return signal for varying strengths of the RF interrogation signal. Typically, a flat response is desired, (i.e., relatively little change in return signal strength even where the interrogation signal strength varies significantly.

In another aspect, the RFID tag verifier determines the response in terms of signal strength of the response signals for interrogation signals having different frequencies. In some applications, a flat response will be desirable, while in other applications frequency selectivity may be desirable.

In another embodiment, the verifier determines the response in terms of frequency for interrogation signals having varying strengths.

In another aspect a machine-readable symbol verifier that verifies machine-readable symbols such as barcodes, area and stacked codes, can be coupled to, or formed as an integral part of the RFID tag verifier. Such a system allows automatic verification of RFID tags that carry machine-readable symbols. The RFID tag verifier can produce a letter grade corresponding to the response of the RFID tag and/or the quality of a machine-readable symbol.

In a further aspect, a printer can be coupled to, or formed as an integral part of, the RFID tag verifier. The printer can print information corresponding to the response of the RFID tag. The printer can, for example, print a letter grade, and/or a rejected or accepted indicia. Additionally, or alternatively, the printer can print values corresponding to an RFID tag's response characteristics. The printer can print a report on print media, or can print directly onto the RFID tag. Printing directly on the RFID tag allows a tag's operational characteristics to be easily ascertained. The information can be printed as human readable text, or as machine-readable symbols. Thus, the quality of RFID tags can be ensured, and RFID tags may be classed for appropriate use.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with RFID tags, processors, memories, printers and machine-readable symbology verifiers have not been shown or described in detail to avoid unnecessarily obscuring descriptions of the embodiments of the invention. This description initially addresses the hardware aspects of the invention, including a number of alternative structures. A discussion of the operation of the various structures follows the hardware discussion.

Figure 1:
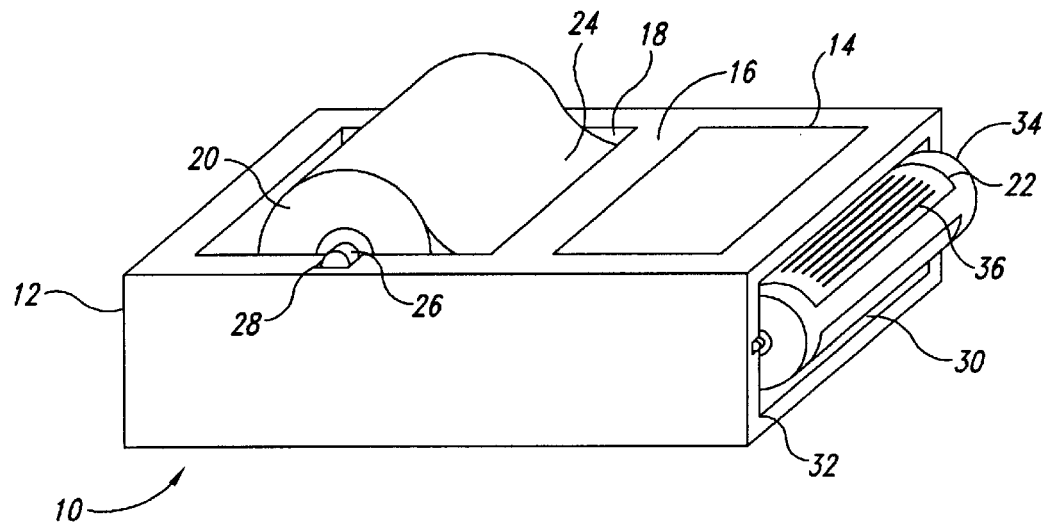
FIG. 1 is an isometric view of a RFID tag verifier.

FIG. 1 shows an RFID tag verifier 10 including a housing 12 and a display 14 mounted in a top 16 of the housing 12. The housing 12 includes an opening 18 for receiving a supply roll 20 of RFID tags 22 that may be carried on a continuous web or liner 24. A supply roll axle 26 supportedly received by a notch 28 can rotatably mount the supply roll 20 to the housing 12. An opening 30 in an end 32 of the housing 12 receives a take-up roll 34. While the RFID tags 22 are shown carried by the web 24, the RFID tag verifier 10 can also verify individual RFID tags 22. The RFID tags 22 can carry printed indicia, including human readable text and/or machine-readable symbols 36 such as bar codes, area and stacked codes.

Figure 2:
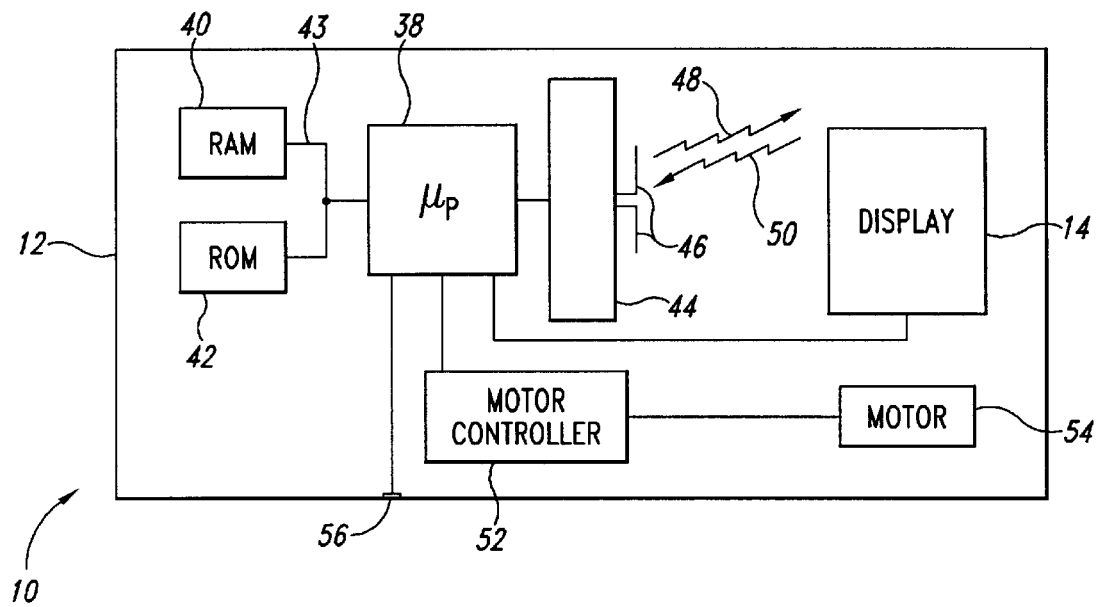
FIG. 2 is a functional block diagram of the RFID tag verifier of FIG. 1.

With reference to FIG. 2, the RFID tag verifier 10 includes a processor 38 and memories such as random access memory ("RAM") 40 and read-only memory ("ROM") 42. The RAM 40 provides temporary storage for the processor 38 while the ROM 42 can store program instructions for the processor 38 to control the various elements of the RFID tag verifier 10 in performing the verification process. A bus 43 provides the processor 38 access to the RAM 40 and ROM 42. The RFID tag verifier 10 further includes a transceiver 44 and an antenna 46. The processor 38 controls the transceiver 44 and antenna 46 to selectively produce an interrogation signal 48 to interrogate the RFID tag 22. The processor 38 further controls the transceiver 44 and antenna 46 to receive a response signal 50 from the RFID tag 22 in response to the interrogation signal 48. The RFID tag verifier 10 further includes a motor controller 52 that controls a motor 54 in response to signals from the processor 38. The motor 54 can drive the take-up roll 34 to advance the web 24 through the verifier 10. The processor further includes an output port 56 to provide communications with a device external to the verifier 10.

Figure 3:
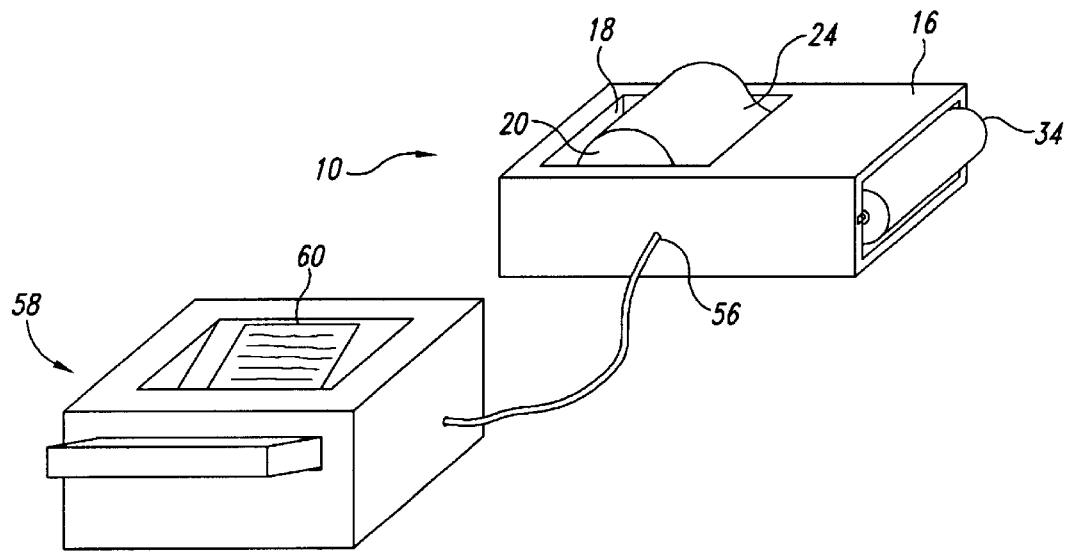
FIG. 3 is an isometric view of the RFID tag verifier of FIG. 1 coupled to a stand-alone printer.

In FIG. 3, the output port 56 of the RFID verifier 10 couples to a stand-alone printer 58. The printer 58 can use the results of the verification process to print a report 60 detailing the operational characteristics and/or a verification grade or status for the RFID tag 22. The operational characteristics and/or verification grade can be used to sort the RFID tags 22. Additionally, or alternatively, the printer 58 can print similar information directly onto the RFID tag 22. The stand-alone printer 58 can be particularly convenient where individual RFID tags 22 are verified. While FIG. 3 shows a hardwired connection between the verifier 10 and printer 58, the verifier 10 can employ other communications links, such as an RF communications link.

Figure 4:
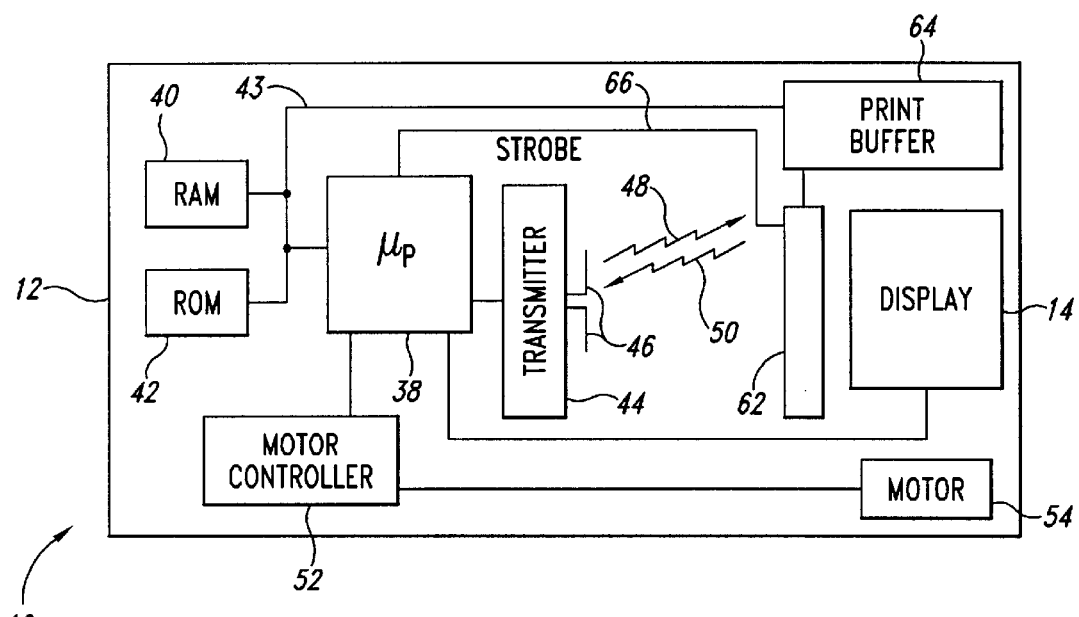
FIG. 4 is a functional block diagram of an RFID tag verifier including a printing mechanism.

As shown in FIG. 4, an alternative embodiment of the present invention employs an integrally formed print mechanism. This alternative embodiment, and those alternative embodiments and other alternatives described herein, are substantially similar to previously described embodiments, and common acts and structures are identified by the same reference numbers. Only significant differences in operation and structure are described in detail below.

FIG. 4 shows a print head 62 and a print buffer 64 in the housing 12 of the RFID tag verifier 10. The print head 62 can take the form of any of a variety of conventional print heads, such as ink jet, laser, or thermal print heads. In an alternative embodiment, a portion of the RAM 40 can form the print buffer 64. The microprocessor 38 accesses the print buffer 64 over the bus 43. The microprocessor 38 supplies a strobe signal across a strobe line 66 to the print head 62 to cause the print head 62 to print the data stored in the print buffer 64.

Figure 5:
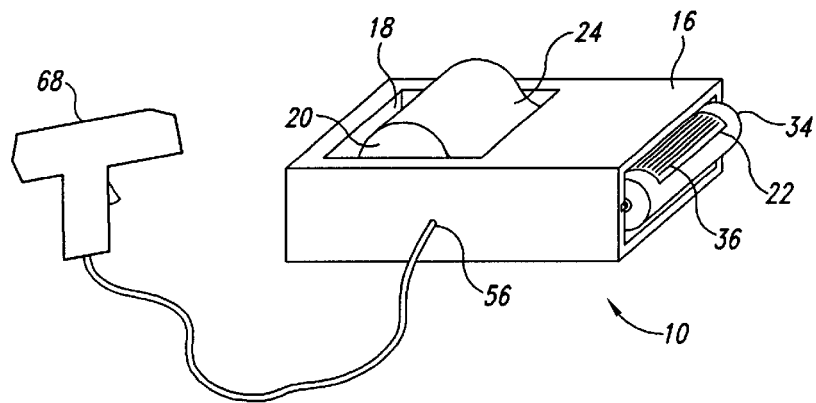
FIG. 5 is an isometric view of an RFID tag verifier coupled to a standalone machine-readable symbology verifier.

In FIG. 5, the output port 56 of the RFID tag verifier 10 couples to a stand-alone machine-readable symbology verifier 68. The symbology verifier 68 acquires or images a machine-readable symbol, such as a barcode, area or stacked code, and verifies the image to assure that the symbol is within published specifications for the particular symbology. Symbology verifiers are well known in the art and will therefore not be described in detail. Thus, the symbol 36 carried by the RFID tag 22 can be verified at substantially the same time that the operation of the RFID tag 22 is verified.

Figure 6:
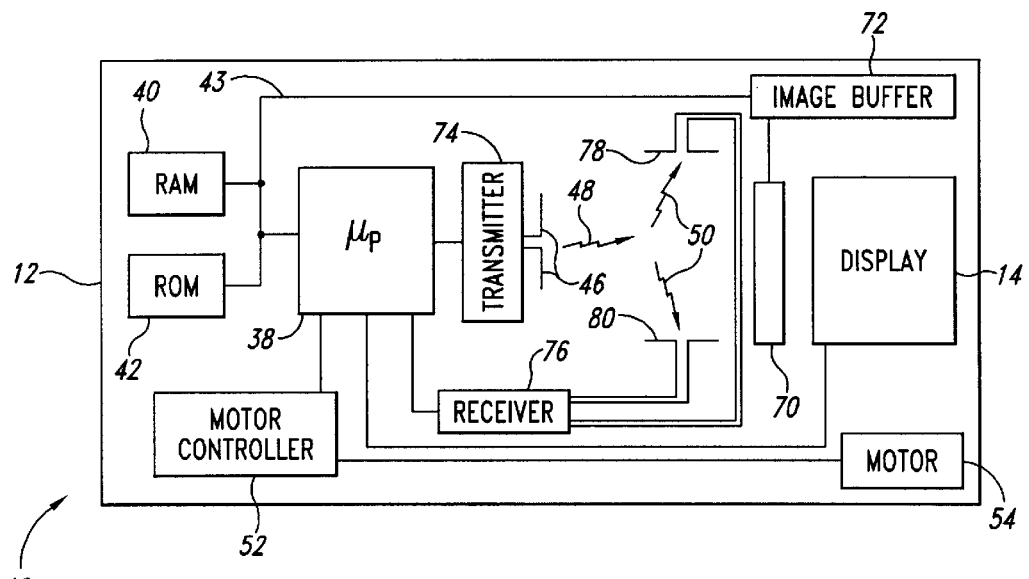
FIG. 6 is a functional block diagram of an RFID tag verifier including two antennas and a machine-readable symbology verifier.

In FIG. 6, the RFID tag verifier 10 includes an image head 70 and an image buffer 72 to acquire and store an image of the machine-readable symbol 36 (FIG. 5) for verification. The image head 70 can take any of a variety of conventional forms, such as a laser scanner, or a one- or two-dimensional charge coupled device ("CCD"). The image head 70 is positioned within the housing 12 such that the symbol 36 scans by the image head 70 as the web 24 passes from supply roll 20 to take-up roll 34. The microprocessor 38 accesses the data in the image buffer 72 over the bus 43. The ROM 42 can store instructions for causing the processor 38 to verify the data in the image buffer 72, as is conventionally known in the art.

The embodiment of FIG. 6, also includes a separate transmitter 74 and a receiver 76. The transmitter 74 couples to the antenna 46 to transmit interrogation signals 48. The receiver 76 couples to spaced apart antennas 78, 80 to receive the return signal 50 from the RFID tag 22. The spaced apart antennas 78, 80 permit the processor 38 to determine the directionality of the response signal 50 generated by the RFID tag 22. While only two antennas 78, 80 are shown, additional antennas can increase the refinement of the directionality measurement.

Figure 7:
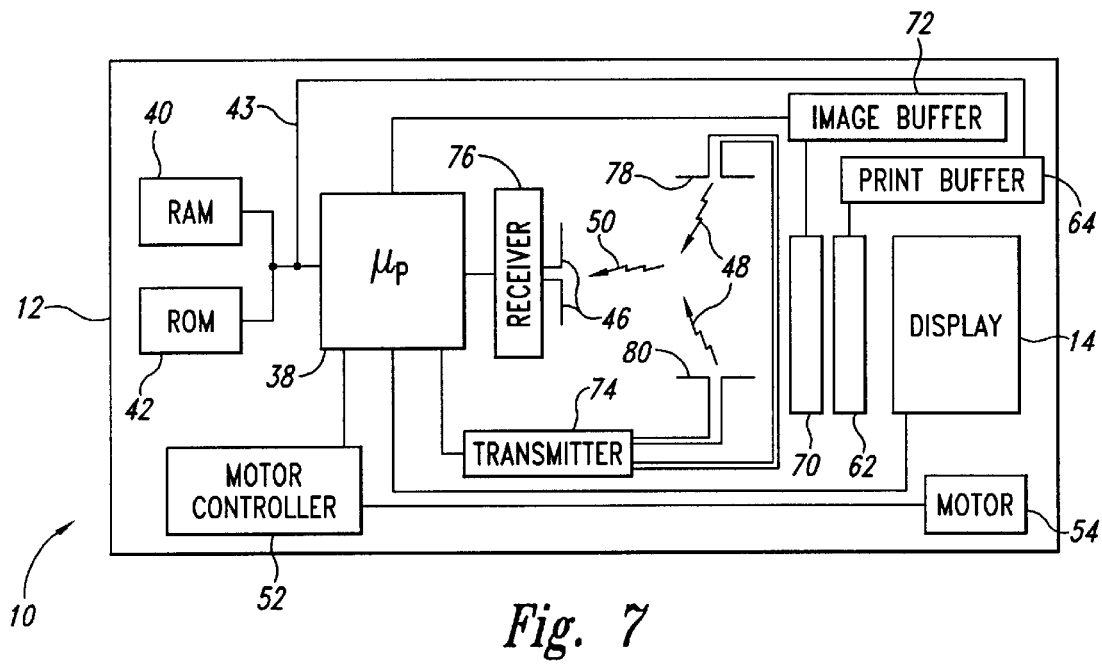
FIG. 7 is a functional block diagram of an RFID tag verifier having two transmitting antennas and including a machine-readable symbology verifier and a printing mechanism.

FIG. 7 shows an embodiment having two spaced apart transmitting antennas to measure the directionality of the RFID tag's 22 reception. The receiver 76 is coupled to the antenna 46 to receive the response signal 50 from the RFID tag 22. The transmitter 74 is coupled to the spaced first and second antennas 78, 80 to transmit the interrogation signals 48. The processor 38 can determine the directionality of the RFID tag's reception from the response signal 50 corresponding to the interrogation signal 48 from each of the antennas 78, 80. Again, the RFID tag verifier 10 can employ additional antennas to further refine the directionality response measurement. The RFID tag verifier 10 of FIG. 7 also includes the image head 70 and print head 62 of FIGS. 6 and 4, respectively.

A method of verifying an RFID tag will now be discussed with general reference to FIGS. 1–7, and with specific reference to FIG. 8. In step 100, the processor 38 activates the transceiver 44 at a first time to produce a first interrogation signal 48 having a first power level. In step 102, the transceiver 44 receives a first response signal 50 from the RFID tag 22 in response to the first interrogation signal 48. At a second time, the processor 38 activates the transceiver 44 to produce a second interrogation signal 48, identical to the first interrogation signal but having a second power level. In step 106, the transceiver 44 receives a second response signal 50, in response to the second interrogation signal 48. In step 108, the processor 38 determines the RFID tags response based on the difference between the first and second response signals 50.

In some applications, the user desires a flat response, that is a response signal having one or more relatively constant parameters even though the interrogation signal's parameters may vary greatly. For example, the strength of the interrogation signal 48 is inversely proportional to the distance between the interrogator 68 (FIG. 5) and the RFID tag 22. In many real world applications, the distance between the interrogator 68 and RFID tag 22 cannot be reliably controlled. In such cases, the user still desires a consistent, flat response from the RFID tag 22 any time the RFID tag 22 is within range of the interrogator 68. The method of FIG. 8 can verify that an RFID tag 22 will provide such a consistent response.

Figure 13:
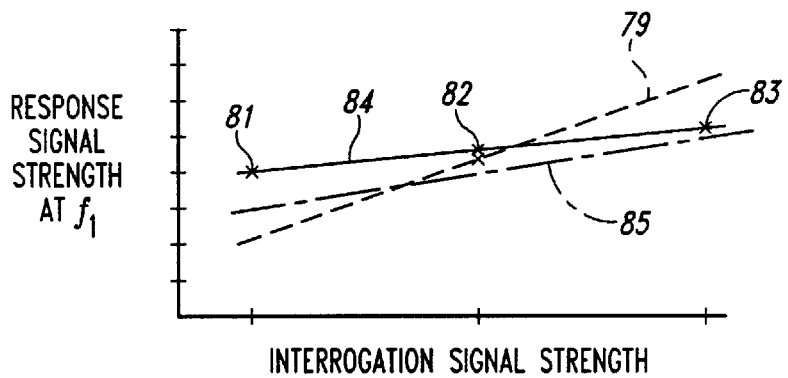
FIG. 13 is a graph showing the strength of a response signal for varying interrogation signal strengths.
Figure 14:
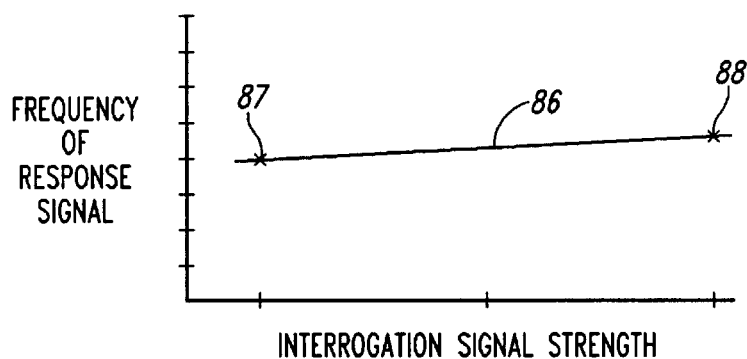
FIG. 14 is a graph showing the frequency of a response signal for varying interrogation signal strengths.

FIG. 13 shows an example of determining the RFID tag's response. The strength of response signals at a given frequency $f_1$ is plotted for three interrogation signals 48 having different power levels or strengths identified by data points 81–83. A line 84 through the data points 81–83 defines the response and the slope of the response. The processor 38 can compare the slope of the response 84 to the slope of a predefined acceptable response 85, and determine whether the tag is acceptable or should be rejected. Alternatively, the processor 38 can use the comparison to produce a numerical value representing the difference between the response 84 and an acceptable response 85. A broken line 79, identifies an unacceptable response. With reference to FIG. 14, a similar comparison can be made with respect to frequency for the response signal, having a response as shown by line 86 for two different power levels of the interrogation signal 48 defined by data points 87, 88.

Returning to FIG. 8, in step 110 the processor 38 can output the RFID tag's response. The processor 38 can output the response in any or all of a number of forms. For example, the output can take in the form of a binary accept or reject decision, or can comprise values corresponding to the measured response, or the difference or percentage difference between the measured response and some predetermined acceptable response 85. The processor 38 can display the output to the display 14 of the verifier 10 (FIG. 1). Additionally, or alternatively, the processor 38 can output the response in a report or label 60 using the printer 58 (FIG. 3). Additionally, or alternatively, the processor 38 can cause the print head 62 to print the response directly on the RFID tag 22 (FIG. 4). Printing directly on the RFID tag 22 provides a visible indication whether an RFID tag is acceptable, and can provide precise measurements of the operating characteristics of the RFID tag 22. In an optional step 111, the RFID tags 22 can be graded and/or sorted based on the operating characteristics. For example, the RFID tags 22 can be manually sorted based on human readable grades printed directly on the RFID tags. Alternatively, the RFID tags can be automatically sorted based on grades printed directly on the RFID tags 22 in the form of machine-readable symbols such as bar codes, and area or stacked codes.

Figure 8:
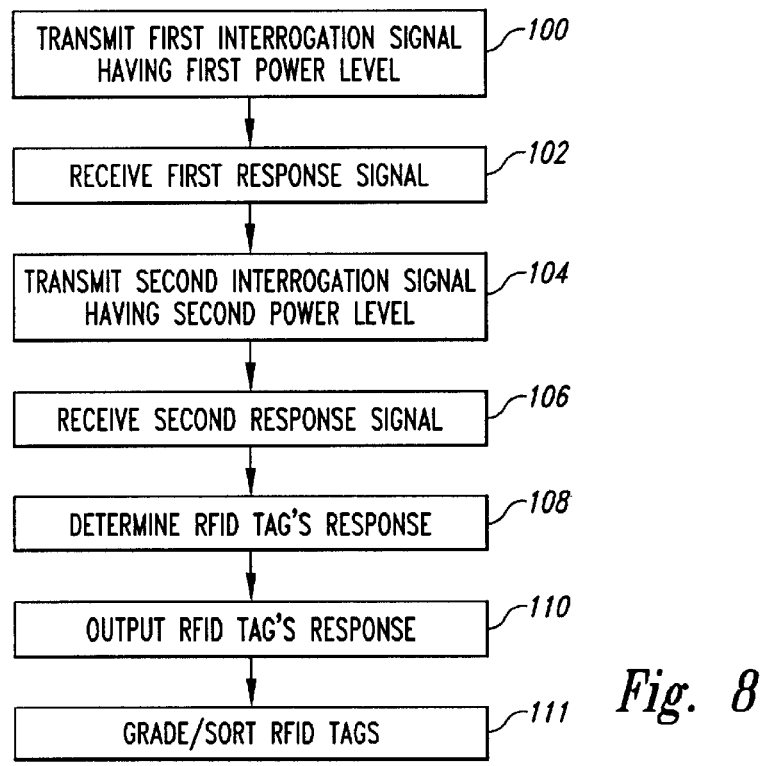
FIG. 8 is a flowchart of a general method of determining an RFID tag's response.
Figure 9:
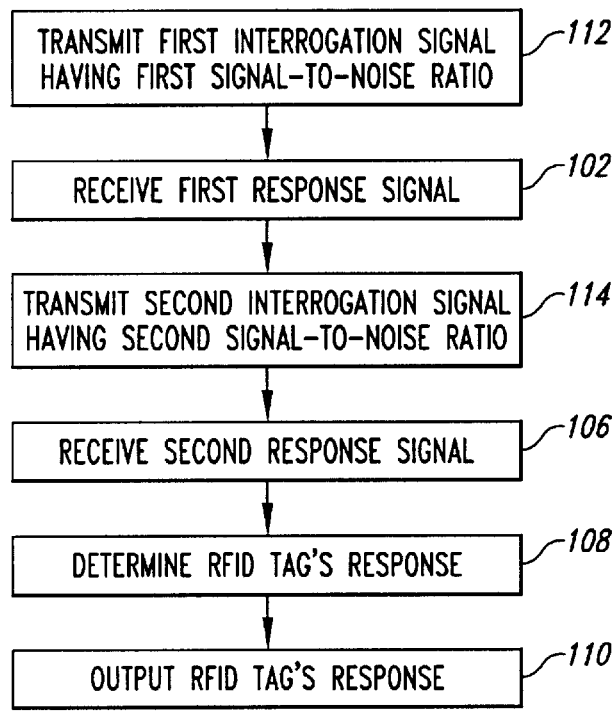
FIG. 9 is a flowchart of a method of determining an RFID tag's response to interrogation signals having varying signal-to-noise ratios.
Figure 10:
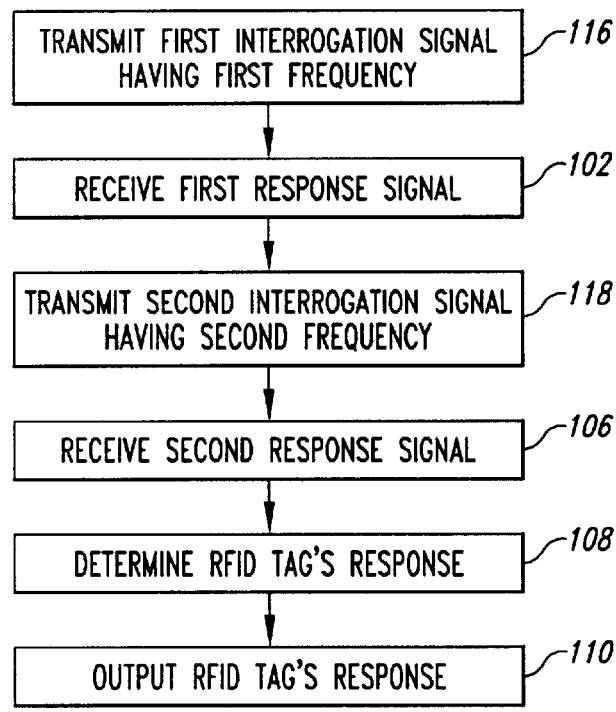
FIG. 10 is a flowchart of a method of determining an RFID tag's response to an interrogation signal of varying frequency.
Figure 15:
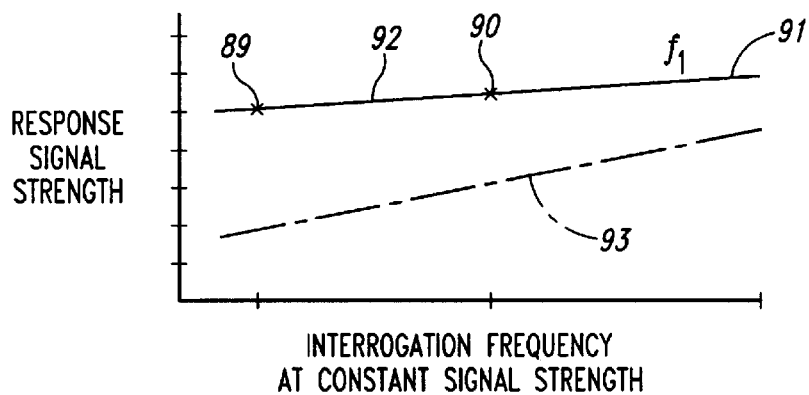
FIG. 15 is a graph showing the response signal strength for interrogation signals of varying frequency.

FIG. 9 shows a method similar to the method of FIG. 8 but where the transmitter produces first and second interrogation signals 48 having first and second signal-to-noise ratios under steps 112, 114 respectively (FIG. 14). Similarly, in the method of FIG. 10, the transceiver 44 produces first and second interrogation signals 48 having respective first and second frequencies in steps 116, 118. In FIG. 15, the transceiver 44 produces an interrogation signal 48 at three different frequencies, corresponding to the data points 89–91, as per the method of FIG. 10. The data points 89–91 define a line 92 that provides a slope that the processor 38 can compare to a minimum acceptable response, shown as a broken line 93.

Figure 11:
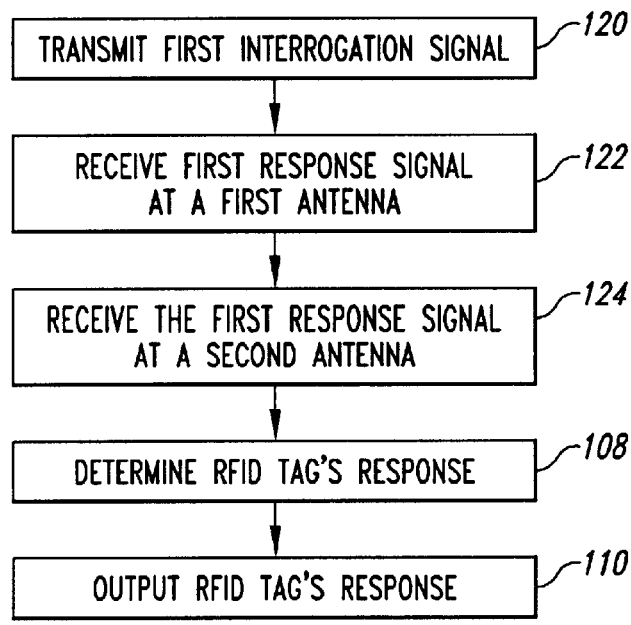
FIG. 11 is a flowchart of a method of determining the directionality of an RFID tag's response to an interrogation signal.
Figure 16:
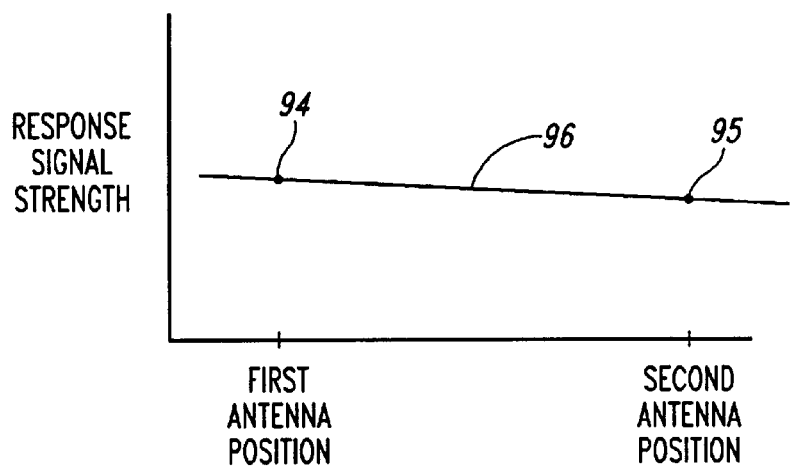
FIG. 16 is a graph showing response signal strength for varying locations of interrogation signal origin.

A method of determining the directionality of the RFID tag's 22 response signal 50 is set out in FIG. 11 and employs the verifier 10 of FIG. 6. There is an interesting discussion of directionality in commonly assigned U.S. patent application Ser. No. 09/193,281, filed Nov. 17, 1998, and entitled "OPTICAL AND PASSIVE ELECTROMAGNETIC READER FOR READING MACHINE-READABLE SYMBOLS, SUCH AS BAR CODES, AND READING WIRELESS TAGS, SUCH AS RADIO FREQUENCY TAGS, AND CORRESPONDING METHOD,". In step 120, the processor 38 activates the transmitter 74 to produce a first interrogation signal 48. In step 122, the first antenna 78 receives a first response signal from the RFID tag 22. In step 124, the second antenna 80 receives the first response signal 50 from the RFID tag 22. The first and second antennas 78, 80 are spaced with respect to one another about the RFID tag 22 so as to be sensitive to the directionality of the RFID tags transmissions. The RFID tag verifier 10 can employ more than two antennas 78, 80 to further refine the directionality measurement. An example of the RFID tag's response is shown in FIG. 16, where data points 94, 95 corresponding to the response signal received at the first and second antennas 78, 80, respectively, define the response 96 of the RFID tag 22.

Figure 12:
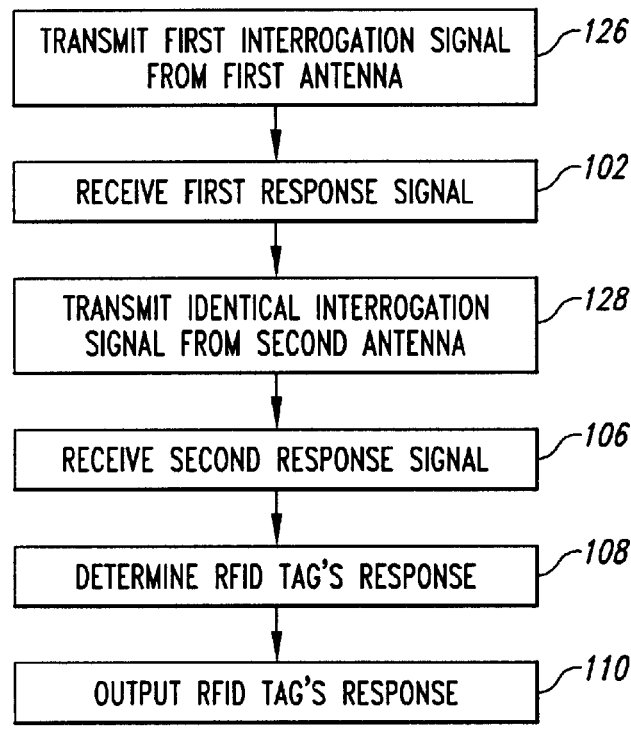
FIG. 12 is a flowchart of a method of determining a directionality of an RFID tags reception.
Figure 17:
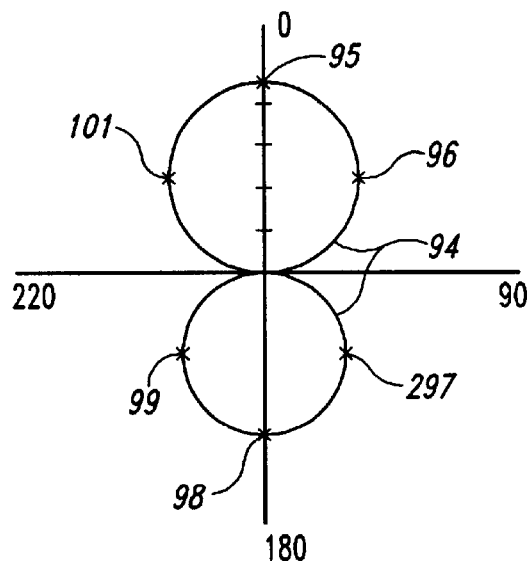
FIG. 17 is a graph showing directionality of a response signal.

FIG. 12 shows a method of determining the directionality of the RFID tag's 22 reception and will be discussed with reference to the RFID tag verifier 10 of FIG. 7. In step 126, the processor 38 causes the transmitter 74 to produce a first interrogation signal from the first antenna 78. In step 102, the receiver 76 receives a first response signal 50 from the RFID tag 22. In step 128, the processor 38 causes the transmitter 74 to produce a second interrogation signal 48 having identical operating characteristics from the second antenna 80, spaced from the first antenna 78. In step 106, the receiver 76 receives a second response signal 50 from the RFID tag 22. The process can continue for four other antennas (not shown). With reference to FIG. 17, the processor 38 can determine a response 94 from data points 95–99, 101 corresponding to six transmitting antennas (only 78 and 80 are shown) spaced about the RFID tag 22.

Although specific embodiments of, and examples for, the invention are described herein for illustrative purposes, various equivalent modifications can be made without departing from the spirit and scope of the invention, as will be recognized by those skilled in the relevant art. The teachings provided herein of the invention can be applied to other memory devices, not necessarily the exemplary RFID tag generally described above. RFID tags may employ other communications frequencies in the electromagnetic spectrum. The RFID tag verifier can use more than the two interrogation signal typically shown in the examples. The response can be represented by data points, as a slope, or as a mathematical function, such as a b-spline representing a curve. A software controlled attenuator can achieve the power level modification, while a software controlled oscillator such as a voltage controlled oscillator ("VCO") can achieve frequency modification. One skilled in the art will recognize that the response is dependent on a number of parameters, and that these parameters must be maintained within certain tolerances to accurately measure the response. These parameters include, antenna-to-tag distances, ambient noise level, reflective objects, and ambient temperatures. The teachings of the U.S. patents and patent applications mentioned above are incorporated herein by reference.

These and other changes can be made to the invention in light of the above detailed description. In general, in the following claims, the terms used should not be construed to limit the invention to the specific embodiments disclosed in the specification and the claims, but should be construed to include all verifiers that operate in accordance with the claims. Accordingly, the invention is not limited by the disclosure, but instead its scope is to be determined entirely by the following claims.

We claim:

1. An apparatus to verify RFID tags, comprising:
an RF interrogator configured to selectively transmit a first interrogation signal at a first time and a second interrogation signal at a second time, the first interrogation signal having a first operational characteristic that differs from a corresponding first operational characteristic of the second interrogation signal wherein the first operational characteristic is signal strength, and to receive a first return signal returned from an RFID tag in response to the first interrogation signal and a second return signal returned from the RFID tag in response to the second interrogation signal; and
a processor coupled to the RF interrogator and configured to determine an operational response of the RFID tag in the form of at least a second operational characteristic of the first and the second return signals wherein the second operational characteristic is frequency.

2. An apparatus to verify RFID tags, comprising:
an RF interrogator configured to selectively transmit a first interrogation signal at a first time and a second interrogation signal at a second time, the first interrogation signal having a first operational characteristic that differs from a corresponding first operational characteristic of the second interrogation signal, and to receive a first return signal returned from an RFID tag in response to the first interrogation signal and a second return signal returned from the RFID tag in response to the second interrogation signal;
a processor coupled to the RF interrogator and configured to determine an operational response of the RFID tag in the form of at least a second operational characteristic of the first and the second return signals; and
a machine-readable symbol verifier positioned to verify a machine-readable symbol on the RFID tag.

3. An apparatus to verify RFID tags, comprising:
an RF interrogator configured to selectively transmit a first interrogation signal at a first time and a second interrogation signal at a second time, the first interrogation signal having a first operational characteristic that differs from a corresponding first operational characteristic of the second interrogation signal, and to receive a first return signal returned from an RFID tag in response to the first interrogation signal and a second return signal returned from the RFID tag in response to the second interrogation signal;
a processor coupled to the RF interrogator and configured to determine an operational response of the RFID tag in the form of at least a second operational characteristic of the first and the second return signals; and
a machine-readable symbol imager positioned to image a machine-readable symbol on the RFID tag and coupled to the processor to supply the image data thereto, the processor being configured to verify the image data.

4. An apparatus to verify RFID tags, comprising:
an RF interrogator configured to selectively transmit a first interrogation signal at a first time and a second interrogation signal at a second time, the first interrogation signal having a first operational characteristic that differs from a corresponding first operational characteristic of the second interrogation signal, and to receive a first return signal returned from an RFID tag in response to the first interrogation signal and a second return signal returned from the RFID tag in response to the second interrogation signal;
a processor coupled to the RF interrogator and configured to determine an operational response of the RFID tag in the form of at least a second operational characteristic of the first and the second return signals; and
a machine-readable symbol imager positioned to image a machine-readable symbol on the RFID tag and coupled to the processor to supply the image data thereto, the processor configured to verify the image data and to provide a grade based on the verification of the image data and the comparison of the response of the RFID tag to the predetermined response.

5. A method to verify RFID tags, comprising:
selectively transmitting a first interrogation signal having a first operational characteristic;
selectively transmitting a second interrogation signal having a first operational characteristic that differs from the corresponding first operational characteristic of the first interrogation signal by a defined amount;
receiving a first return signal returned from an RFID tag in response to the first interrogation signal, the first return signal having a second operational characteristic wherein receiving a first return signal having a second operational characteristic includes detecting the first return signal of a first frequency;

receiving a second return signal returned from the RFID tag in response to the second interrogation signal, the second return signal having a second operational characteristic corresponding to the second operational characteristic of the first return signal wherein receiving a second return signal having a second operational characteristic includes detecting the second return signal of a second frequency that differs from the first frequency; and determining a response of the RFID tag corresponding to the second operational characteristic of at least the first and the second return signals.

6. A method to verify RFID tags, comprising:

selectively transmitting a first interrogation signal having a first operational characteristic;

selectively transmitting a second interrogation signal having a first operational characteristic that differs from the corresponding first operational characteristic of the first interrogation signal by a defined amount;

receiving a first return signal returned from an RFID tag in response to the first interrogation signal, the first return signal having a second operational characteristic;

receiving a second return signal returned from the RFID tag in response to the second interrogation signal, the second return signal having a second operational characteristic corresponding to the second operational characteristic of the first return signal; and determining a response of the RFID tag corresponding to the second operational characteristic of at least the first and the second return signals wherein determining a response of the RFID tag corresponding to the second operational characteristic of at least the first and the second return signals includes determining a slope of a function including at least a first point corresponding to the first operational characteristic of first interrogation signal and the second operational characteristic of the first return signal, and a second point corresponding to the first operational characteristic of the second interrogation signal and the second operational characteristic of the second return signal.

* * * * *